(12) United States Patent
Liao et al.

(10) Patent No.: US 6,382,278 B1
(45) Date of Patent: May 7, 2002

(54) WOOD PLANING MACHINE

(76) Inventors: Juei-Seng Liao, No. 295, Sec. 1, Nanking E. Rd.; Pei-Lieh Chiang, No. 12, Nan-Ping Rd., Nan Dist, both of Taichung City (TW)

( * ) Notice: Subject to any disclaimer, the term of this patent is extended or adjusted under 35 U.S.C. 154(b) by 0 days.

(21) Appl. No.: 09/929,444

(22) Filed: Aug. 14, 2001

(30) Foreign Application Priority Data

Jun. 27, 2001 (TW) .......................................... 90210787

(51) Int. Cl.$^7$ .............................. B27G 19/00; B27C 1/00
(52) U.S. Cl. ................................ 144/252.1; 144/114.1; 144/117.1; 409/137; 83/100
(58) Field of Search ............................ 144/114.1, 116, 144/117.1, 129, 130, 252.1, 252.2; 83/51, 98, 100; 409/137; 15/339, 415.1

(56) References Cited

U.S. PATENT DOCUMENTS

| | | | |
|---|---|---|---|
| 4,009,741 A | * 3/1977 | Zimmerman | ................. 144/39 |
| 6,148,879 A | * 11/2000 | Liao | .................... 144/252.1 X |
| 6,289,956 B1 | * 9/2001 | Shriver | ................ 144/117.1 X |
| 6,293,321 B1 | * 9/2001 | Chiang | ................ 144/117.1 X |

* cited by examiner

*Primary Examiner*—W Donald Bray
(74) *Attorney, Agent, or Firm*—Ladas & Parry

(57) ABSTRACT

A wood planning machine includes a rotatable cutting member mounted to a machine frame and driven by a motor. A drive transmission member transmits the rotating force of the cutting member to a drive shaft to operate a blowing member when the motor is actuated. A shaving collecting member is disposed above and in the vicinity of the cutting member for collecting wood shavings during a wood planing operation. The shaving collecting member is further turnable relative to the machine frame between open and closed positions.

9 Claims, 8 Drawing Sheets

WOOD PLANING MACHINE

CROSS-REFERENCE TO RELATED APPLICATION

This application claims priority of Taiwan patent Application No. 090210787, filed on Jun. 27, 2001.

BACKGROUND OF THE INVENTION

1. Field of the Invention

This invention relates to a wood planing machine, more particularly to a wood planing machine with a wood shaving collecting mechanism which is driven by a motor thereof.

2. Description of the Related Art

Referring to FIG. 1, a conventional wood planing machine is shown to include a machine frame 10 with two mounting sides 11, a support carriage 12 which is disposed movably between the mounting sides 11 in an upright direction, and a cutting member with a rotating shaft 14 which is driven by a motor 13. Since a large amount of wood shavings are formed and scatters during a wood planing operation of the machine, collecting means is needed to collect the wood shavings.

SUMMARY OF THE INVENTION

The object of the present invention is to provide a wood planing machine which has a wood shaving collecting mechanism to collect wood shavings during a wood planing operation.

According to this invention, the wood planing machine includes a machine frame which has left and right mounting sides spaced apart from each other in a longitudinal direction, and front and rear sides spaced apart from each other in a transverse direction and disposed between the right and left mounting sides to define a path for passage of a workpiece. A motor is disposed in the machine frame, and has an output shaft which defines a first axis and which extends in the longitudinal direction to deliver a driving force. A cutting member has a rotating shaft which is rotatably mounted on the right and left mounting sides, and which extends in the longitudinal direction to define a second axis parallel to the first axis, and a cutting blade which is mounted on and which is rotated with the rotating shaft about the second axis. A first drive transmission member transmits the driving force of the output shaft to the rotating shaft. A shaving collecting member is disposed on the machine frame, and confines a duct which extends along the path. The duct has an intake port in the vicinity of the cutting member, and an outlet port opposite to the intake port in the transverse direction. A casing has proximate and distal walls which are spaced apart from each other in the longitudinal direction and which are respectively proximate and distal to the outlet port to confine an accommodating chamber, and a discharge port which is disposed between the proximate and distal walls and which extends in a direction radial to the longitudinal direction. The proximate wall has an inlet port which is formed therethrough in the longitudinal direction and which is communicated with the outlet port so as to communicate the duct with the accommodating chamber. A drive shaft is rotatably mounted on the distal wall, extends along a third axis parallel to the second axis, and has a first end which extends into the accommodating chamber, and a second end which extends from the first end and outwardly of the distal wall. A second drive transmission member transmits the rotating force of the rotating shaft to the second end of the drive shaft so as to rotate the drive shaft about the third axis when the motor is operated. An impeller is received in the accommodating chamber, and is driven by the first end of the drive shaft to rotate about the third axis so as to draw wood shavings from the shaving collecting member into the accommodating chamber and out of the discharge port.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
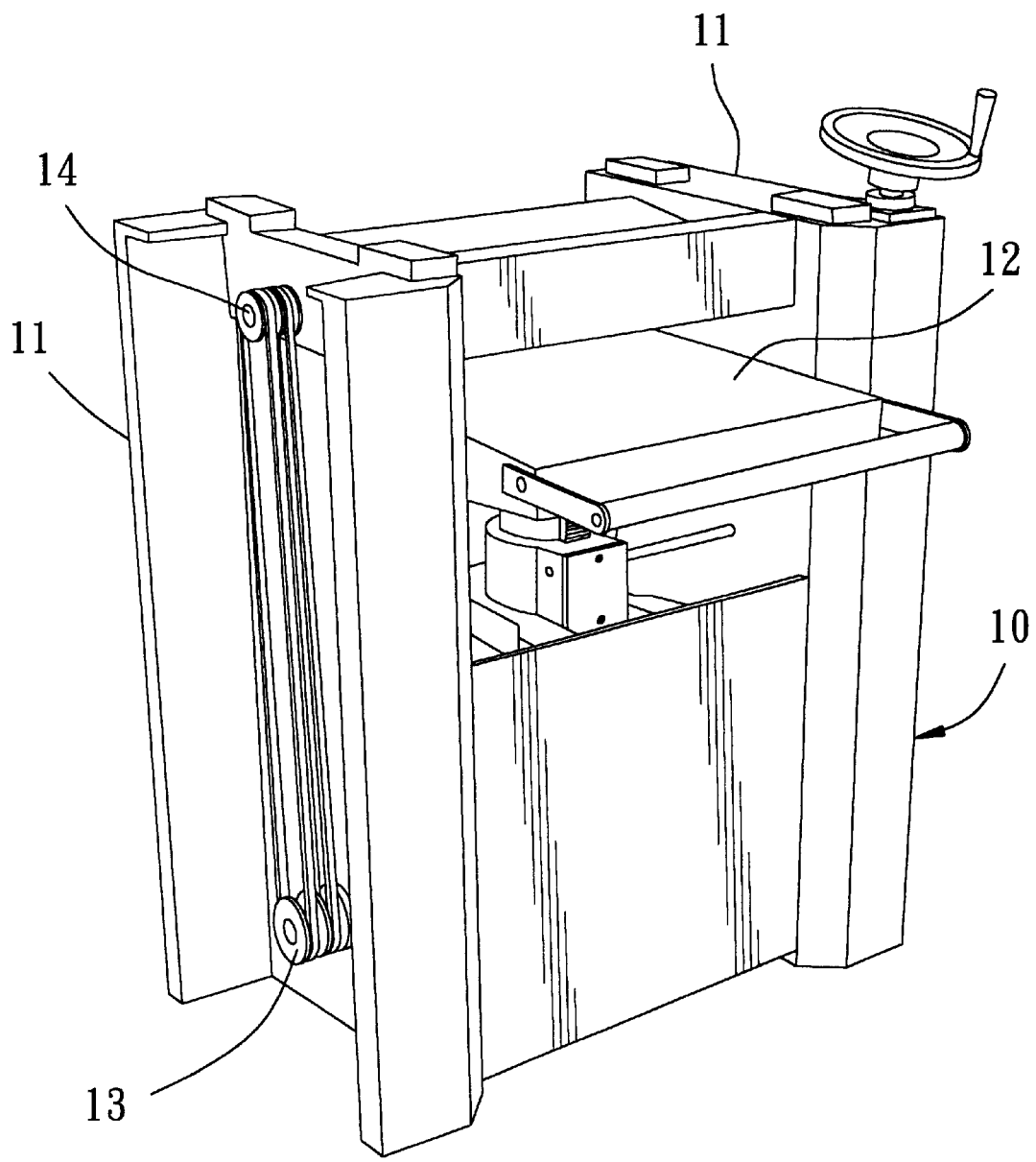
FIG. 1 is a perspective view of a conventional wood planing machine.
Figure 2:
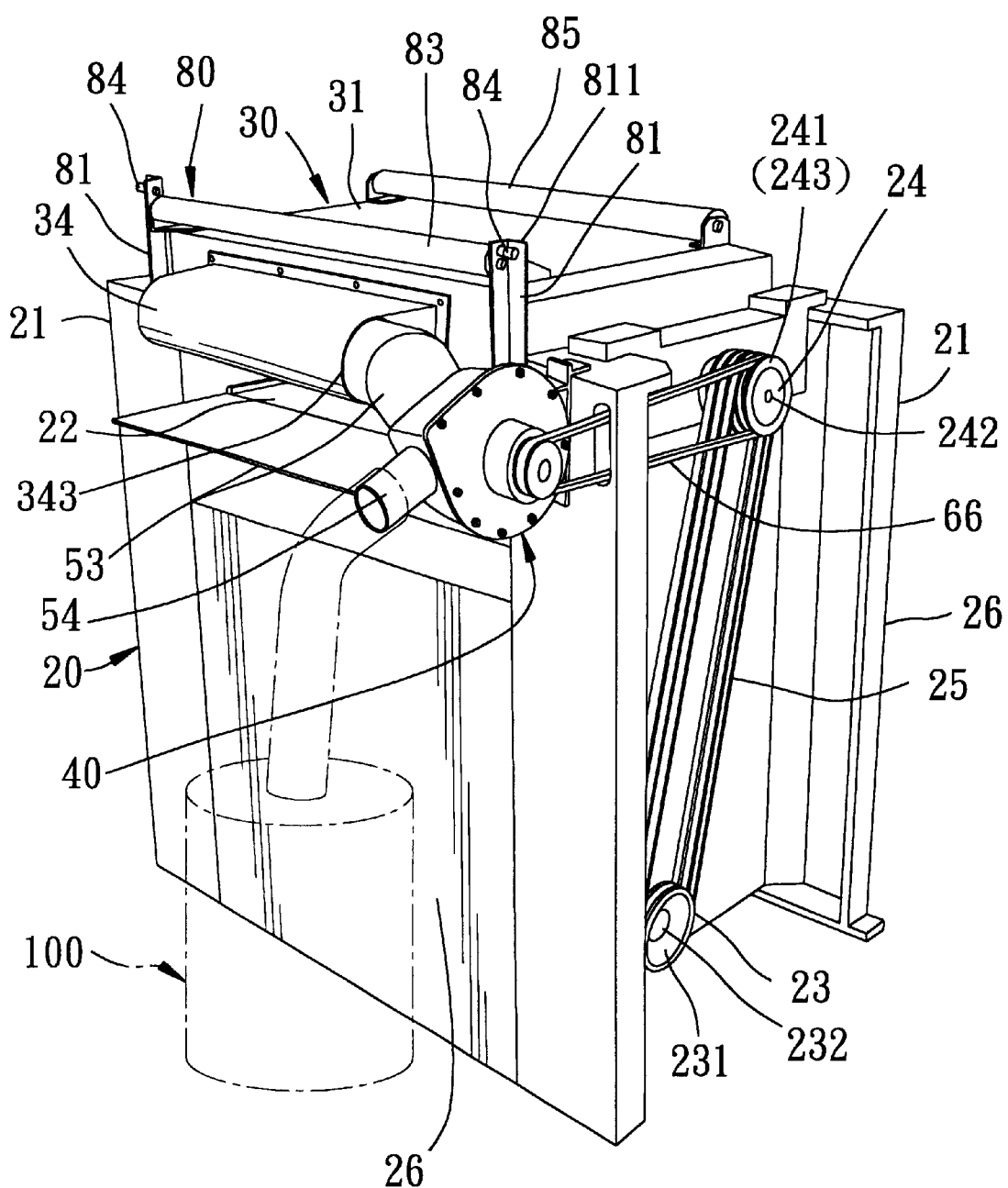
FIG. 2 is a perspective view of a preferred embodiment of a wood planing machine according to this invention.

Referring to FIG. 2, the preferred embodiment of the wood planing machine according to the present invention is shown to comprise a machine frame 20, a motor 23, a cutting member 24, a wood shaving collecting member 30, and a blowing mechanism 40.

The machine frame 20 has left and right mounting sides 21 which are spaced apart from each other in a longitudinal direction. Each of the mounting sides 21 has upper and lower ends opposite to each other in an upright direction transverse to the longitudinal direction. The machine frame 20 further has front and rear sides 26 which serve as feed-in and take-out sides, which are spaced apart from each other in a transverse direction relative to the longitudinal and upright directions, and which are disposed between the right and left mounting sides 21 so as to define a path in the transverse direction for passage of a workpiece (not shown).

The motor 23 is disposed in the machine frame 20 adjacent to the lower ends of the mounting sides 21, and has an output shaft 232 which defines a first axis and which extends in the longitudinal direction to deliver a driving force.

Figure 5:
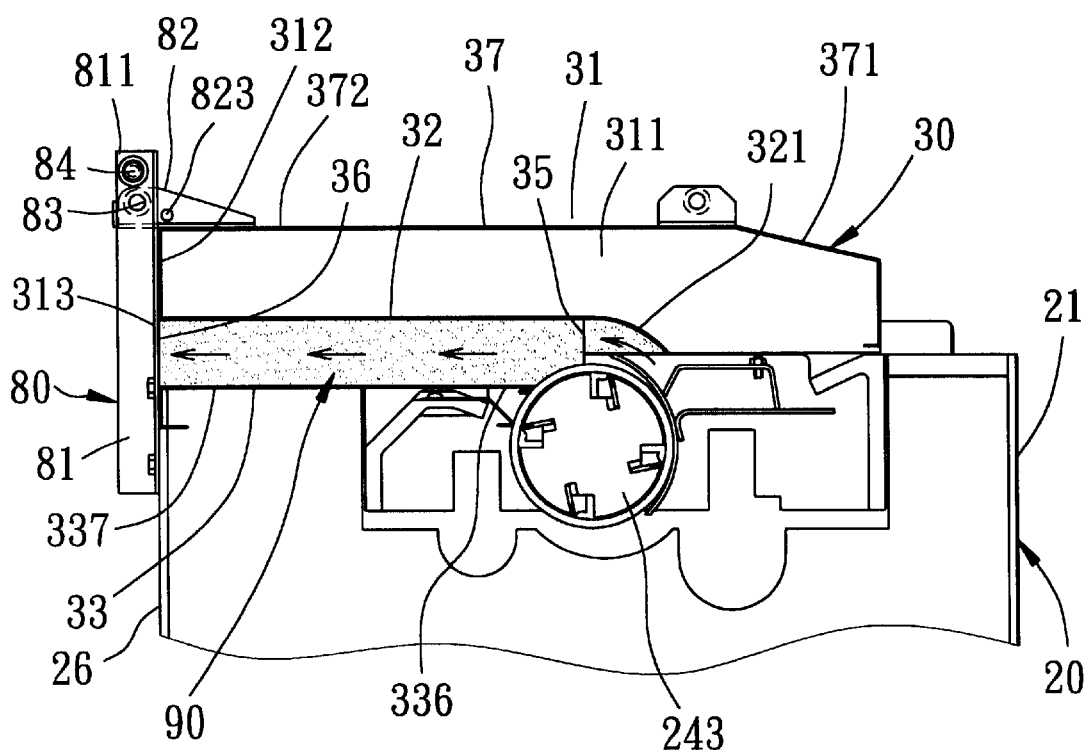
FIG. 5 is a fragmentary schematic view showing the flow of wood shavings in the shaving collecting member.

The cutting member 24 has a rotating shaft 242 which is rotatably mounted on the mounting sides 21, and which extends in the longitudinal direction to define a second axis parallel to the first axis, and a cutting blade 243 (as shown in FIG. 5) which is mounted on and which is rotated with the rotating shaft 242 about the second axis.

A first drive transmission member is disposed outwardly of the left mounting side 21, and includes a drive pulley 231 which is mounted to rotate with the output shaft 232 of the motor 23, a first driven pulley 241 which is mounted to rotate with the rotating shaft 242, and a first belt 25 which is trained on the drive and first driven pulleys 231,241 to transmit the driving force of the output shaft 232 to the rotating shaft 242.

A carriage 22 is disposed movably between the mounting sides 21 in the upright direction so as to support the workpiece thereon.

Figure 3:
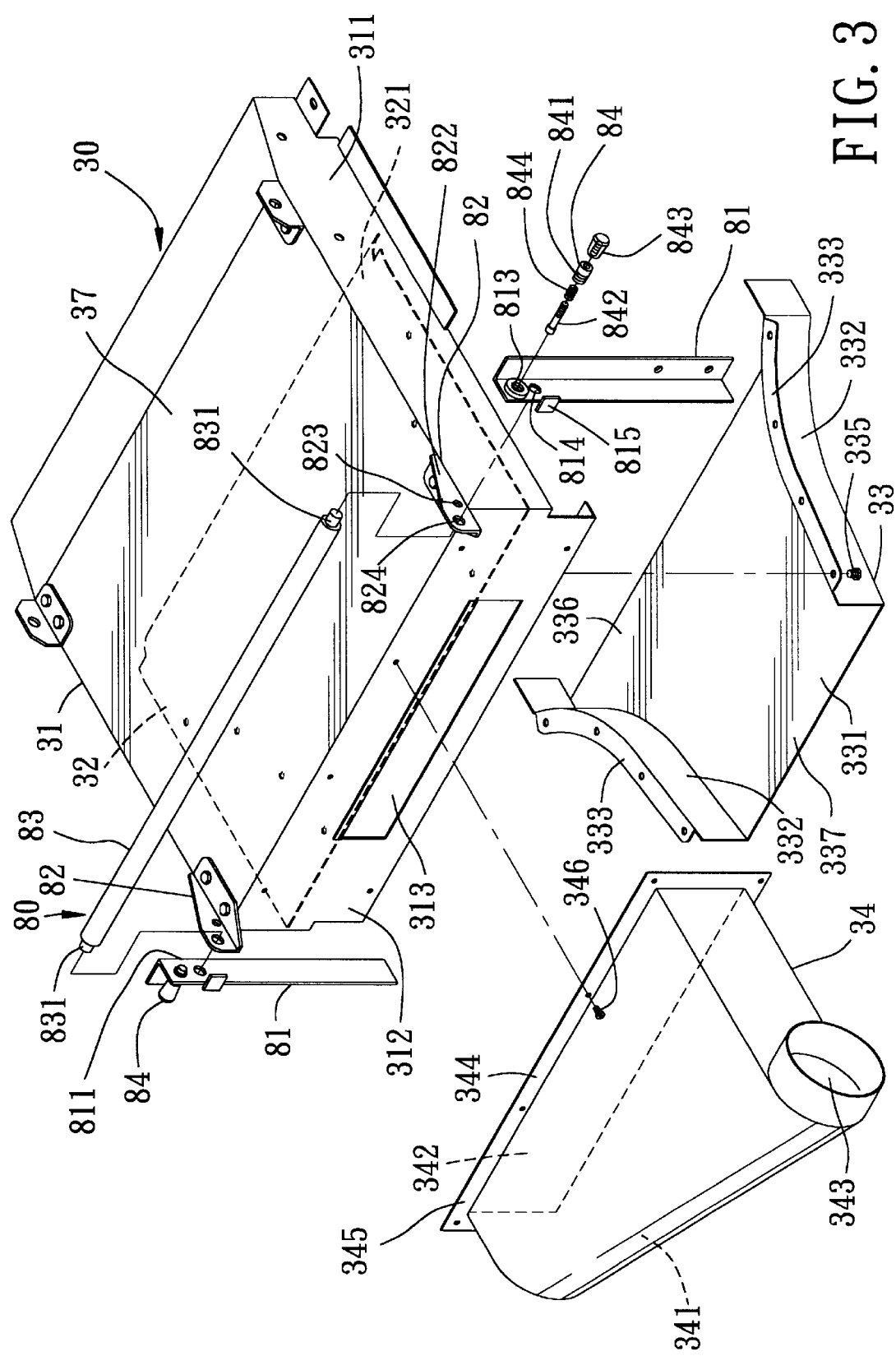
FIG. 3 is an exploded perspective view showing a shaving collecting member of the wood planing machine of the preferred embodiment.

The shaving collecting member 30 is disposed on the machine frame 20 adjacent to the upper ends of the mounting sides 21 to collect wood shavings. With reference to FIGS. 3 and 5, the shaving collecting member 30 includes an upper plate 31, a lower plate 33, and a hood member 34. The upper plate 31 includes upper and lower plate portions 37,32 and two side plate portions 311. The upper plate portion 37 has a first front end portion 371 which is disposed above the front side 26 of the machine frame 20, and a first rear end portion 372 which is disposed opposite to the first front end portion 371 in the transverse direction. The lower plate portion 32 has an arcuate middle portion 321 which is disposed between the first front and rear end portions 371,372 and which is spaced apart from and disposed above the cutting member 24. A rear end wall 312 extends downwardly from the first rear end portion 372 and is formed with an opening 313.

The lower plate 33 includes a main plate portion 331 and two upwardly extending side walls 332 with two connecting portions 333 which are secured on the lower plate portion 32 by means of screws 335. As shown in FIG. 5, the main plate portion 331 has a second front end portion 336 which extends to the vicinity of the cutting member 24 and which is spaced apart from the middle portion 321 to confine an intake port 35, and a second rear end portion 337 which is disposed opposite to the second front end portion 336 in the transverse direction and which extends between the first rear end portion 372 and the take-out side 26. The second rear end portion 337 cooperates with the first rear end portion 372 to confine a passageway 36 which is communicated with the opening 313.

The hood member 34 confines a hollow chamber 341, and includes an end wall 345 which has an opening 342 and a connecting portion 344 that is secured to the rear end wall 312 by means of screws 346 so as to align the openings 342,313 with each other such that the passageway 36 is communicated with the hollow chamber 341 to form a duct along the path of the workpiece. An outlet port 343 is disposed in the hood member 34 at a location distal to the end wall 345 and is communicated with the hollow chamber 341.

Figure 4:
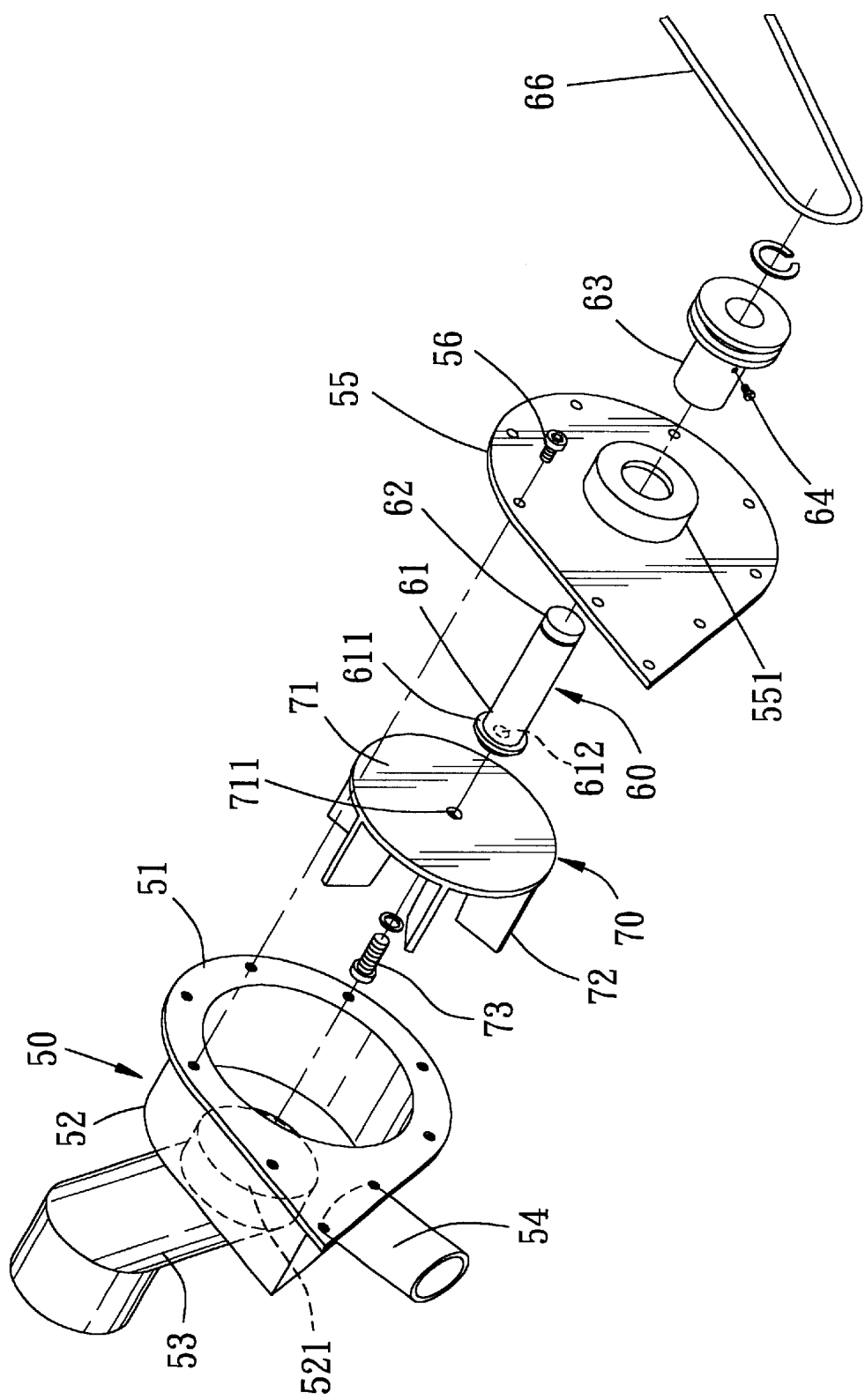
FIG. 4 is an exploded perspective view showing a blowing mechanism of the wood planing machine of the preferred embodiment.
Figure 6:
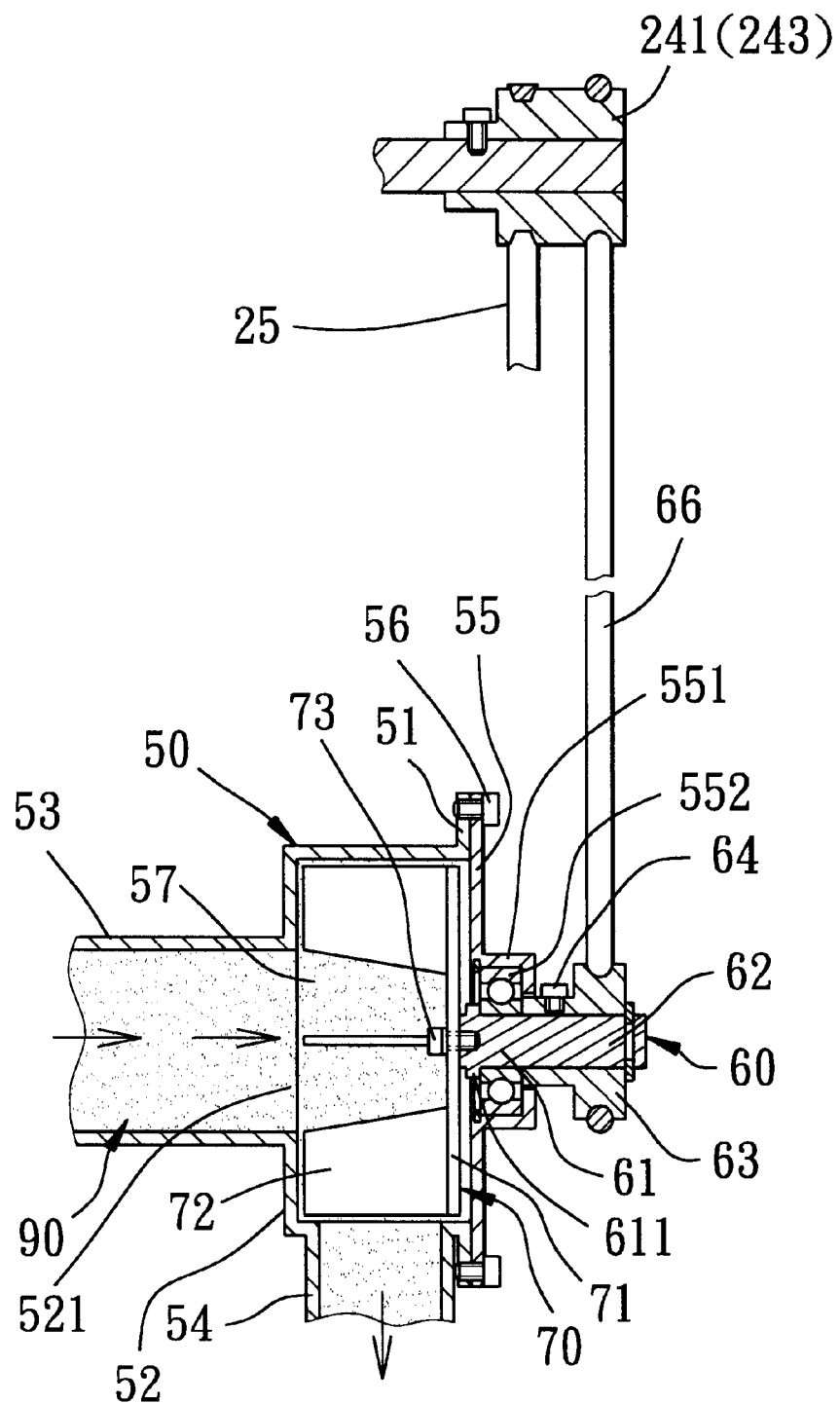
FIG. 6 is a fragmentary sectional view showing how the blowing mechanism is operated to draw the wood shavings.

Referring to FIGS. 2, 4 and 6, the blowing mechanism 40 includes a casing 50, a tubular member 53, a drive shaft 60, and an impeller 70. The casing 50 has proximate and distal walls 52,51 which are spaced apart from each other in the longitudinal direction and which are disposed respectively proximate and distal to the outlet port 343 to confine an accommodating chamber 57. The casing 50 further has a discharge port 54 which is disposed between the proximate and distal walls 52,51 and which extends in a direction radial to the longitudinal direction. The proximate wall 52 has an inlet port 521 which is formed therethrough in the longitudinal direction and which is communicated with the outlet port 343 via the tubular member 53 so as to communicate the duct with the accommodating chamber 57. A cover plate 55 is secured on the distal wall 51 by means of screws 56, and has a bearing seat 551 for receiving a bearing 552 therein.

The drive shaft 60 is rotatably mounted on the distal wall 51 and the cover plate 55, and extends along a third axis parallel to the second axis. The drive shaft 60 includes a first end 61 which extends into the accommodating chamber 57 and which has a ring portion 611 for abutting against the bearing 552, and a second end 62 which extends from the first end 61 and outwardly of the bearing seat 551. A second drive transmission member includes a second driven pulley 243 which is mounted to rotate with the rotating shaft 242 and which rotates synchronously with the first driven pulley 241, a third driven pulley 63 which is mounted on the drive shaft 60 by means of a screw 64 for rotation therewith, and a second belt 66 which is trained on the second and third driven pulleys 243,63 to transmit a rotating force of the rotating shaft 242 to the drive shaft 60 so as to rotate the drive shaft 60 synchronously about the third axis when the motor 23 is operated. The first and second driven pulleys 241,243 may be formed integrally with each other.

The impeller 70 is received in the accommodating chamber 57, and includes a connecting plate 71 which is secured on the first end 61 of the drive shaft 60 by a screw 73 that passes through a hole 711 and that engages threadedly a screw hole 612 in the first end 61 so as to be driven by the first end 61 to rotate a plurality of fins 72 on the connecting plate 71 about the third axis. Thus, when the motor 23 is actuated during a wood planing operation, wood shavings 90 can be drawn from the duct of the shaving collecting member 30 into the accommodating chamber 57 via the tubular member 53 and out of the discharge port 54. Preferably, referring to FIG. 2, a shaving bag 100 is disposed to be connected to the discharge port 54.

Preferably, the shaving collecting member 30 is mounted pivotally to the take-out side 26 of the machine frame 20 by a connecting member 80 such that the first front end portion 371 is turnable about a pivoting axis parallel to the first axis relative to the first rear end portion 372 between closed and open positions to be disposed proximate and distal to the feed-in side 26, respectively.

As shown in FIG. 3, the connecting member 80 includes two elongated posts 81, two mounting seats 82, and a pivot shaft 83. The posts 81 are secured to and extend upwardly and respectively from the right and left mounting sides 21 adjacent to the take-out side 26, and have upper post ends 811 which extend upwardly of the upper plate 31. The mounting seats 82 are secured to the first rear end portion 372 adjacent to the posts 81 respectively, and have pivot portions 822 which extend upwardly from the first rear end portion 372 and which are aligned respectively with the upper post ends 811 in the longitudinal direction. The pivot shaft 83 extends along the pivoting axis, and has two shaft ends 831, each of which passes rotatably through a pivot hole 824 in the respective pivot portion 822 and a pivot hole 814 in the respective upper post end 811. As such, the first front end portion 371 is turnable relative to the posts 81 about the pivoting axis between the closed and open positions.

Figure 7:
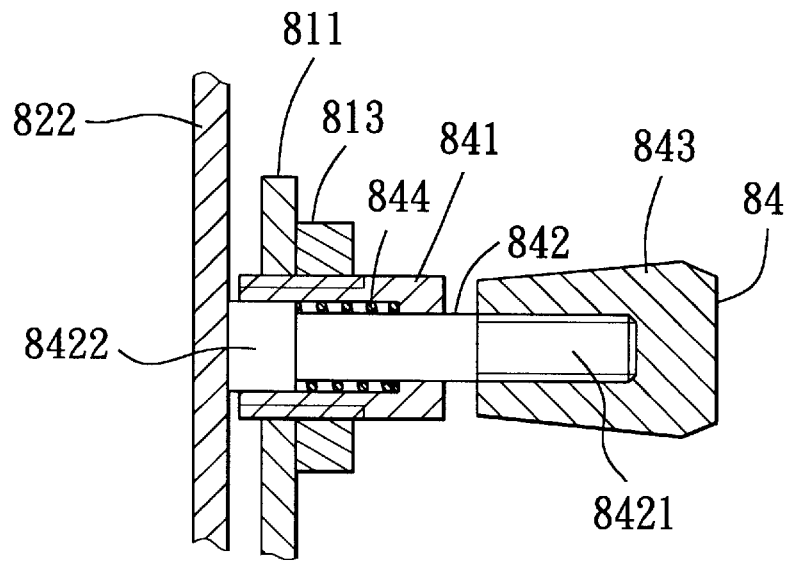
FIG. 7 is a fragmentary sectional view showing a locking member of the preferred embodiment in an unlocked state.
Figure 8:
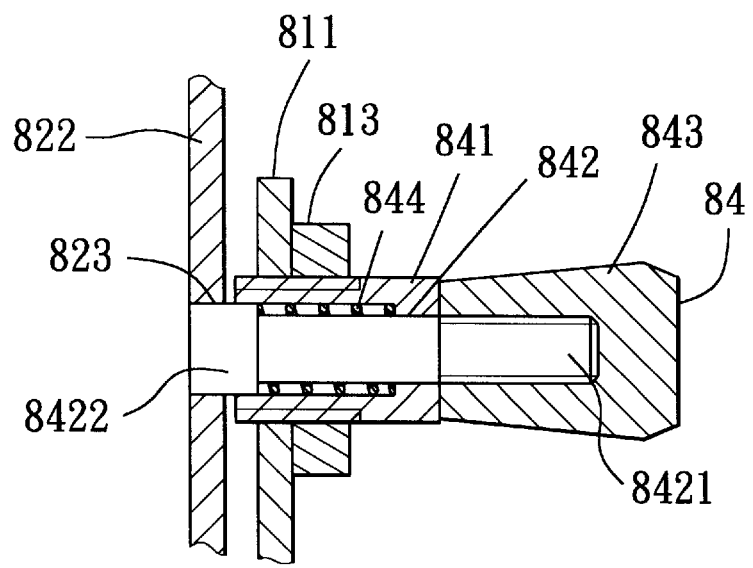
FIG. 8 is a fragmentary sectional view showing the locking member in a locked state.
Figure 9:
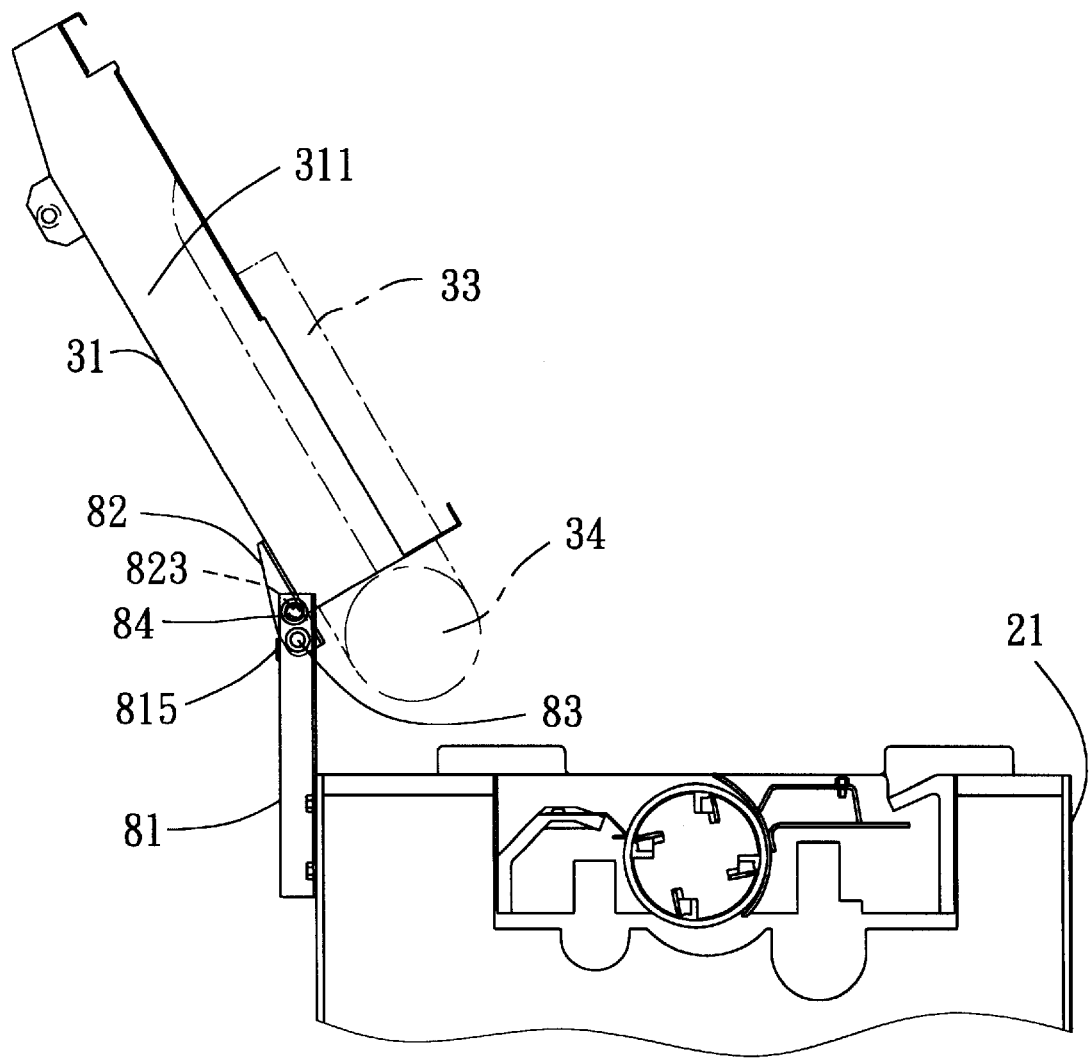
FIG. 9 is fragmentary side view showing the shaving collecting member in an open position.

Each of two locking members 84 is disposed between the respective pivot portion 822 and the respective upper post end 811. With reference to FIGS. 7 and 8, each locking member 84 includes a sleeve 841 which is secured to an internally threaded portion 813 on the upper post end 811, a pin 842 with an end which extends movably through the sleeve 841 and which has an enlarged head 8422 and an opposite end 8421 which is provided with an operating cap 843, a compression spring 844 which is received in the sleeve 841 to bias the head 8422 toward the pivot portion 822, and a block 815 which is disposed to stop the first front end portion 371 in the open position, as shown in FIG. 9. When the first front end portion 371 is in the closed position, the head 8422 abuts against the pivot portion 822, as shown in FIG. 7. Before the shaving collecting member 30 is turned to the open position, the operating cap 843 is pulled outwardly against the biasing force of the compression spring 844. Once the first front end portion 371 is in the open position, the head 8422 will extend into an insert hole 823 in the pivot portion 822 to lock the mounting seat 82 from movement relative to the posts 81 to retain the first front end portion 371 in the open position. Preferably, a handle 85 is secured on the first front end portion 371 to facilitate turning of the shaving collecting member 30.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A wood planing machine comprising:
   a machine frame having left and right mounting sides spaced apart from each other in a longitudinal direction, each of said left and right mounting sides having upper and lower ends opposite to each other in an upright direction transverse to the longitudinal direction, said machine frame further having front and rear sides spaced apart from each other in a transverse direction relative to the longitudinal and upright directions and disposed between said right and left mounting sides so as to define a path in the transverse direction for passage of a workpiece;
   a motor disposed in said machine frame adjacent to said lower ends of said left and right mounting sides, and having an output shaft defining a first axis and extending in the longitudinal direction to deliver a driving force;
   a cutting member having a rotating shaft which is rotatably mounted on said right and left mounting sides, and which extends in the longitudinal direction to define a second axis parallel to the first axis, and a cutting blade which is mounted on and which is rotated with said rotating shaft about the second axis;
   a first drive transmission member disposed to transmit the driving force of said output shaft to said rotating shaft;
   a shaving collecting member disposed on said machine frame adjacent to said upper ends of said right and left mounting sides to collect wood shavings, said shaving collecting member confining a duct which extends along said path, said duct having an intake port which is disposed in the vicinity of said cutting member, and an outlet port disposed opposite to said intake port in the transverse direction;
   a casing having proximate and distal walls which are spaced apart from each other in the longitudinal direction and which are respectively proximate and distal to said outlet port to confine an accommodating chamber, said casing further having a discharge port which is disposed between said proximate and distal walls and which extends in a direction radial to the longitudinal direction, said proximate wall having an inlet port which is formed therethrough in the longitudinal direction and which is communicated with said outlet port so as to communicate said duct with said accommodating chamber;
   a drive shaft rotatably mounted on said distal wall, extending along a third axis parallel to the second axis, and having a first end which extends into said accommodating chamber, and a second end which extends from said first end and outwardly of said distal wall;
   a second drive transmission member disposed to transmit the rotating force of said rotating shaft to said second end of said drive shaft so as to rotate said drive shaft about the third axis when said motor is operated; and
   an impeller received in said accommodating chamber, and driven by said first end of said drive shaft to rotate about the third axis so as to draw wood shavings from said shaving collecting member into said accommodating chamber and out of said discharge port.

2. The wood planing machine of claim 1, wherein said rear side is a take-out side for leading the workpiece out of said machine frame.

3. The wood planing machine of claim 2, wherein said shaving collecting member includes
   an upper plate having a first front end portion disposed above said front side of said machine frame, a first rear end portion disposed opposite to said first front end portion in the transverse direction, and a middle portion disposed between said first front and rear end portions and spaced apart from and disposed above said cutting member,
   a lower plate having a second front end portion extending to the vicinity of said cutting member and spaced apart from said middle portion of said upper plate to confine said intake port, and a second rear end portion disposed opposite to said second front end portion in the transverse direction and extending between said first rear end portion and said take-out side, said second rear end portion cooperating with said first rear end portion to confine a passageway which is communicated with said intake port, and
   a hood member confining a hollow chamber, and including an end wall which has an opening and which is secured to said first and second rear end portions such that said passageway is communicated with said hollow chamber so as to form said duct,
   said outlet port being disposed in said hood member at a location distal to said end wall and being communicated with said hollow chamber.

4. The wood planing machine of claim 3, further comprising a connecting member disposed to pivotally connect said first rear end portion of said upper plate to said take-out side such that said first front end portion is turnable about a pivoting axis parallel to the first axis.

5. The wood planing machine of claim 4, wherein said connecting member includes
   two elongated posts secured to and extending upwardly and respectively from said right and left mounting sides adjacent to said take-out side, and having upper post ends extending upwardly of said upper plate,
   two mounting seats secured to said first rear end portion of said upper plate adjacent to said posts respectively, and having pivot portions extending upwardly from said first rear end portion and aligned respectively with said upper post ends in the longitudinal direction,
   a pivot shaft extending along the pivoting axis, and having two shaft ends, each of which is mounted rotatably on a respective one of said upper post ends and a respective one of said pivot portions, such that said first front end portion is turnable relative to said posts about the pivoting axis between closed and open positions to be disposed proximate and distal to said front side, respectively, and two locking members, each of which is disposed between a respective one of said posts and a respective one of said mounting seats to lock releasably said mounting seats from movement relative to said posts when said first front end portion is in the open position.

6. The wood planing machine of claim 5, further comprising a handle secured on said upper plate and spaced apart from said first rear end portion in the transverse direction so as to facilitate turning of said shaving collecting member.

7. The wood planing machine of claim 2, further comprising a tubular member interconnecting said outlet port and said inlet port.

8. The wood planing machine of claim 1, wherein said first drive transmission member includes a drive pulley mounted to rotate with said output shaft, a first driven pulley mounted to rotate with said rotating shaft, and a first belt trained on said drive and first driven pulleys to transmit the driving force of said output shaft to said rotating shaft.

9. The wood planing machine of claim 1, wherein said second drive transmission member includes a second driven pulley mounted to rotate with said rotating shaft and rotating synchronously with said first driven pulley, a third driven pulley mounted to rotate with said drive shaft, and a second belt trained on said second and third driven pulleys to transmit the rotating force of said rotating shaft to said drive shaft.

* * * * *